Figure 1:
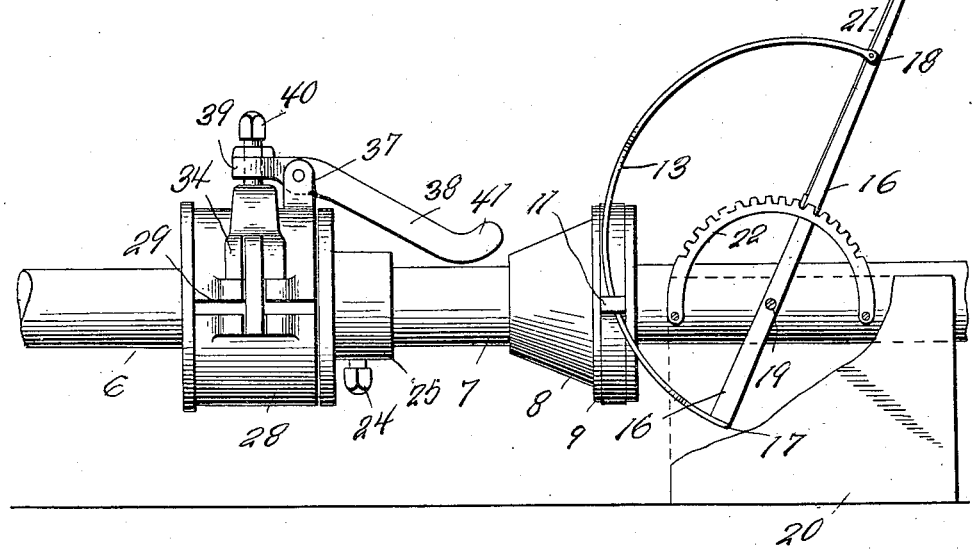

No. 868,108. PATENTED OCT. 15, 1907.
C. J. MOORE.
SHIPPING DEVICE FOR FRICTION CLUTCHES.
APPLICATION FILED APR. 5, 1906.

2 SHEETS—SHEET 1.

Witnesses
G. R. Thomas
J. C. Jones

Inventor
C. J. Moore
By Chandler & Chandler
Attorney

No. 868,108. PATENTED OCT. 15, 1907.
C. J. MOORE.
SHIPPING DEVICE FOR FRICTION CLUTCHES.
APPLICATION FILED APR. 5, 1906.
2 SHEETS—SHEET 2.
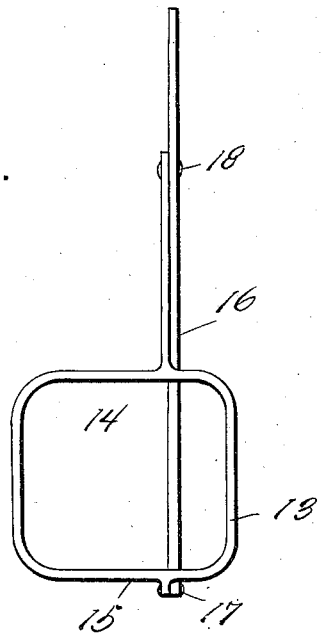
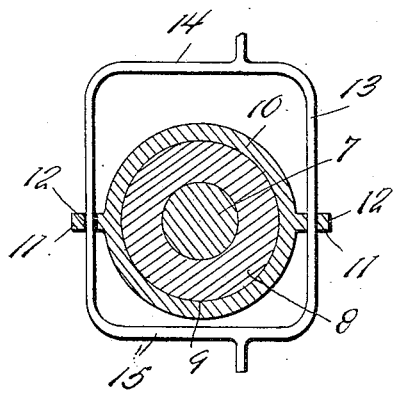
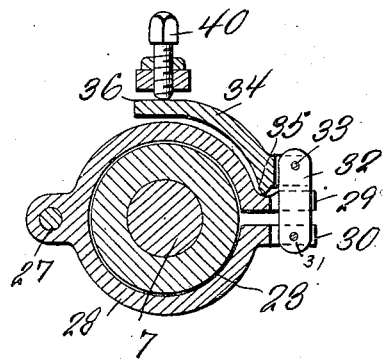
Witnesses
F. C. Jones
F. B. MacNab
Inventor
C. J. Moore
By
Attorneys

UNITED STATES PATENT OFFICE.

CHARLES J. MOORE, OF LEBANON, ILLINOIS.

SHIPPING DEVICE FOR FRICTION-CLUTCHES.

No. 868,108.  Specification of Letters Patent.  Patented Oct. 15, 1907.

Application filed April 5, 1906. Serial No. 310,119.

*To all whom it may concern:*

Be it known that I, CHARLES J. MOORE, a citizen of the United States, residing at Lebanon, in the county of St. Clair, State of Illinois, have invented certain new and useful Improvements in Shipping Devices for Friction-Clutches; and I do hereby declare the following to be a full, clear, and exact description of the invention, such as will enable others skilled in the art to which it appertains to make and use the same.

This invention relates to shipping devices for friction clutches and more particularly to clutches of the split ring type.

The object of the invention is to provide an improved device of this class of simple construction and easy operation.

The invention will be readily understood from a consideration of the following detailed description thereof, and from an inspection of the annexed drawings showing the preferred form of construction, and in which the corresponding parts are designated by similar reference numerals in all of the views.

Figure 2:
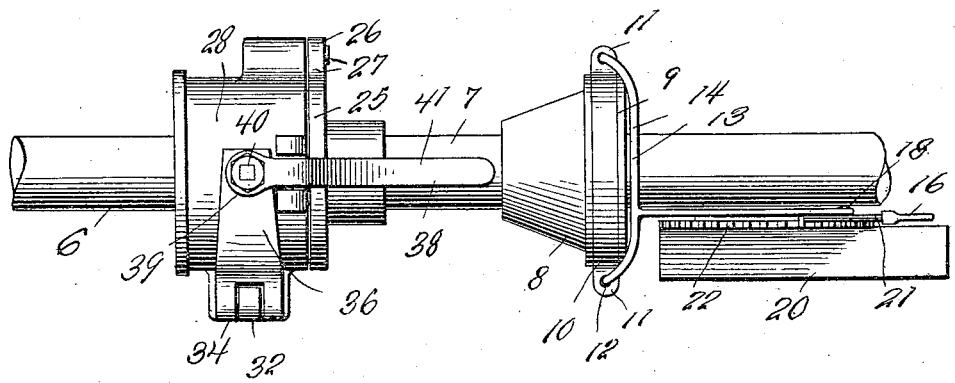

In said drawings, Figure 1 is a side elevation of a pair of sections of shafting with the friction clutch devices applied thereto, and the clutch-operating cone and shifting lever for operating the same. Fig. 2 is a top plan view of Fig. 1. Fig. 3 is a detail view of the shifting lever. Fig. 4 is a transverse vertical section taken through the friction clutch. Fig. 5 is a transverse vertical section taken through the shipping cone.

While the preferred form of friction clutch has been illustrated in the drawings, it is to be understood that the invention is not limited to such form, as the shipping device will operate with equal readiness on any clutch of the type shown.

Referring to said drawings, 6 and 7 designate respectively, the two sections of shafting to be coupled by the friction clutch for the transmission of power from one to the other. Section 7 is constantly driven from any source of power, by means not shown, and is provided with the clutch-operating cone 8 freely movable thereon. Cone 8 is provided adjacent its outer or larger end, with an annular groove 9 in which fits an annular ring 10 of a width sufficient to extend a slight distance beyond the outer edges of groove 9, said ring being provided at diametrically opposite points, in approximately the same horizontal plane as the axis of the shafting, with extensions or ears 11, perforated as at 12, to provide openings for the passage therethrough of the operating section 13 of the shifting lever.

As shown in Figs. 2, 3, and 4, section 13 is in the form of a semicircular rod, provided intermediate its ends with divergent portions forming upper and lower oppositely facing yokes 14 and 15, the arms of which pass through the openings 12 in the ears 11 of ring 10. The lower end of section 13 is bolted to the lower end 17 of the operating lever 16, while the upper end of said section is bolted, as at 18, to said lever at a point approximately central of the upper end of said lever and its pivot 19. The rod 13 is thus bowed in the direction of the clutch members, as is clearly shown in Fig. 1.

Lever 16 is carried by an upright 20 bolted to the floor of the power room and located at one side of the shaft section 7 and in close proximity thereto. It will be obvious, then, when lever 16 is moved to the left in Fig. 1, that the arms of the upper yoke 14 in their passage through the perforated ears 11 of ring 10, will exercise an outward pressure on said ring which will result in a similar movement toward the left of cone 8 upon shaft section 7, while the reverse movement of said lever will in like manner move cone 8 rearwardly, or to the right, on said shaft section. To prevent accidental release of lever 16 from one position or the other, it is provided with a spring-operated brake lever 21, pivoted thereto adjacent the upper end thereof, and provided at its lower end with a pawl coöperating with the teeth of a segmental ratchet 22 likewise carried by upright 20, as shown.

The brake clutch consists of a core 23 keyed fast to what may be termed the inner end of shaft section 6 to rotate therewith, and extending a distance beyond said shaft section to receive the inner end of shaft section 7. Rigidly attached to said latter shaft section by means of a set screw 24, and located adjacent core 23, is a collar 25, provided with a laterally projecting ear 26 perforated to receive the end of a bolt 27 below referred to. A core-clamping broken ring 28, preferably of cast metal, having fixed in one side thereof the bolt 27 engaging with collar 25 operatively occupies a position on the core 23, but is bored to such internal diameter as permits it to rotate freely around said core, when the extremities 29 and 30 of said ring are more or less separated, as shown in Fig. 5, said extremities extending outwardly in parallel relation to each other.

Connected to the lower extremity 30 of ring 28 by means of a pin 31 are two straps 32, the upper ends of which are in turn connected by means of a pin 33 to the short arm of a lever 34. Said arm is provided on its under surface with a shoulder 35 having a fulcrum bearing on the outer face of the upper extremity 29 of said ring. The long arm 36 of said lever 34 extends outside of ring 28 in curved form to about opposite the axial line of the shafting.

Pivoted to a pair of ears 37 on ring 28 is a second lever 38, the short arm 39 of which extends over lever 34 near the free edge of its arm 36, and has an adjustable bearing thereagainst, consisting of a set screw 40 passing through said short arm 39. The long arm 41 of lever 38 extends therefrom above and along shaft section 7 into a position to be engaged by cone 8 to lift said long arm 41. It will be thus apparent that when cone 8 is moved to the left in Fig. 1 to engaging position with arm 41, said arm will be lifted, and arm 39 lowered, thus forcing set screw 40 into contact with the free end 36 of lever 34, which will be correspondingly lowered, forcing shoulder 35 on its short arm into bearing contact with the upper extremity 29 of ring 28, and causing said extremities to approach each other, thereby springing the opposite sections of ring 28 with great force against core 23 and thus frictionally engaging said core, which must therefore rotate coincidingly with said broken ring. A movement of said cone in the opposite direction will permit said ring sections to spring apart and away from said cone, and the rotary movement of said cone therefore ceases. The gripping pressure of the ring section may be correspondingly increased or diminished by adjusting set screw 40 on lever 38.

What is claimed is:

1. The combination, with the clutch members, of a clutch shipping member movable independently of the clutch members and provided with diametrically opposite perforated extensions, and a lever having a rod bowed in the direction of the clutch members and secured at opposite ends thereto for actuating said movable member, said rod including oppositely facing upper and lower yoke portions, the arms of which are slidably engaged in said perforated extensions.

2. The combination, with the clutch members, of a clutch shipping cone longitudinally movable independently of the clutch members and provided with an annular groove, a ring fitting in said groove and provided with diametrically opposite perforated ears, and a lever having a rod bowed in the direction of the clutch members and secured at opposite ends thereto for actuating said cone, said rod including oppositely facing upper and lower yoke portions, the arms of which are slidably engaged in said perforated ears.

In testimony whereof, I affix my signature, in presence of two witnesses.

CHARLES J. MOORE.

Witnesses:
A. L. LINDLY,
ADDISON PYLE.